(12) United States Patent
Alexis

(10) Patent No.: US 11,191,344 B1
(45) Date of Patent: Dec. 7, 2021

(54) ADJUSTABLE MANNEQUIN HEAD

(71) Applicant: Kimberly Alexis, Miami, FL (US)

(72) Inventor: Kimberly Alexis, Miami, FL (US)

( * ) Notice: Subject to any disclaimer, the term of this patent is extended or adjusted under 35 U.S.C. 154(b) by 565 days.

(21) Appl. No.: 16/167,585

(22) Filed: Oct. 23, 2018

(51) Int. Cl.
    *G09B 19/10*    (2006.01)
    *A45D 44/14*    (2006.01)
    *G09B 19/00*    (2006.01)

(52) U.S. Cl.
    CPC ......... *A45D 44/14* (2013.01); *G09B 19/0076* (2013.01)

(58) Field of Classification Search
    CPC .......... G09B 19/00; G09B 19/10; A63H 3/44; A45D 44/14
    USPC .............................................. 434/94; 223/66
    See application file for complete search history.

(56) References Cited

U.S. PATENT DOCUMENTS

| | | | |
|---|---|---|---|
| 3,197,093 A | 7/1965 | Doran | |
| 3,498,510 A | 3/1970 | Johnson | |
| 3,610,486 A | 10/1971 | Kunzmann | |
| 3,709,407 A | 1/1973 | Sanford | |
| 3,843,031 A | 10/1974 | Oh | |
| 4,403,962 A * | 9/1983 | La Vista | G09B 25/00 434/94 |
| 5,090,910 A * | 2/1992 | Narlo | G09B 23/34 434/100 |
| 7,410,358 B2 * | 8/2008 | Morehead | A63H 3/365 434/94 |
| 8,226,413 B2 * | 7/2012 | Yip | A45D 44/14 434/94 |
| 8,496,481 B2 | 7/2013 | Fan | |
| D744,041 S | 11/2015 | Park | |
| 9,314,702 B2 * | 4/2016 | Stafford | A63H 9/00 |
| 9,761,150 B2 | 9/2017 | Pang | |
| 10,206,487 B2 * | 2/2019 | Smith | A45D 44/14 |
| 2008/0197159 A1 * | 8/2008 | Ottley | A45D 44/14 223/67 |
| 2015/0118654 A1 * | 4/2015 | Phillips | A45D 44/14 434/94 |
| 2019/0191852 A1 * | 6/2019 | Boyd | A45D 44/14 |

FOREIGN PATENT DOCUMENTS

WO      2012033508      3/2012

\* cited by examiner

*Primary Examiner* — Kurt Fernstrom
(74) *Attorney, Agent, or Firm* — Kyle A. Fletcher, Esq.

(57) ABSTRACT

The adjustable mannequin head is configured with a postiche. The postiche mounts on the adjustable mannequin head. The adjustable mannequin head comprises a cranial structure further comprising independently adjustable sections that correspond to the cranial bones of a human skull. The independently adjustable sections adjust such that the exterior surfaces of the adjustable mannequin head can be adjusted to resemble the shape of the head of a client. The adjustable mannequin head comprises the cranial structure, a plurality of bolts, an anchor structure, and an orientation structure. The cranial structure supports the postiche during the hairdressing activities. The plurality of bolts adjusts the shape of the exterior surfaces of the cranial structure. The anchor structure secures the plurality of bolts into position. The orientation structure provides a hairdresser with cues that allow the hairdresser to envision better how the postiche will look.

19 Claims, 4 Drawing Sheets

ADJUSTABLE MANNEQUIN HEAD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

FIELD OF THE INVENTION

The present invention relates to the field of personal and domestic articles including hairdressing equipment, more specifically, a postiche head.

SUMMARY OF INVENTION

The adjustable mannequin head is a wig stand that forms a puppet shaped like a human head. The adjustable mannequin head is configured for use in hairdressing. The adjustable mannequin head is configured for use in the preparation and fitting of a postiche. The postiche mounts on the adjustable mannequin head during the hairdressing activities. The adjustable mannequin head is a semi-rigid structure with an elastic nature. The adjustable mannequin head comprises a cranial structure further comprising independently adjustable sections that correspond to adjustable sections of the cranial structure of adjustable mannequin head enable the adjustable mannequin head to adjust such that the exterior surfaces of the adjustable mannequin head can be adjusted to resemble the shape of the head of a client. The adjustable mannequin head comprises the cranial structure, a plurality of bolts, an anchor structure, and an orientation structure. The cranial structure supports the postiche during the hairdressing activities. The plurality of bolts adjust the shape of the exterior surfaces of the cranial structure. The anchor structure secures the plurality of bolts into position. The orientation structure provides a hairdresser with cues that allow the hairdresser to envision better how the postiche will look.

These together with additional objects, features and advantages of the adjustable mannequin head will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable mannequin head in detail, it is to be understood that the adjustable mannequin head is not limited in its applications to the details of construction and arrangements illustration. Those skilled in the art will appreciate that the concept of this disclosure may be readily utilized as a basis for the design of other structures, methods, and systems for carrying out the several purposes of the adjustable mannequin head.

It is therefore important that the claims be regarded as including such equivalent construction insofar as they do not depart from the spirit and scope of the adjustable mannequin head. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
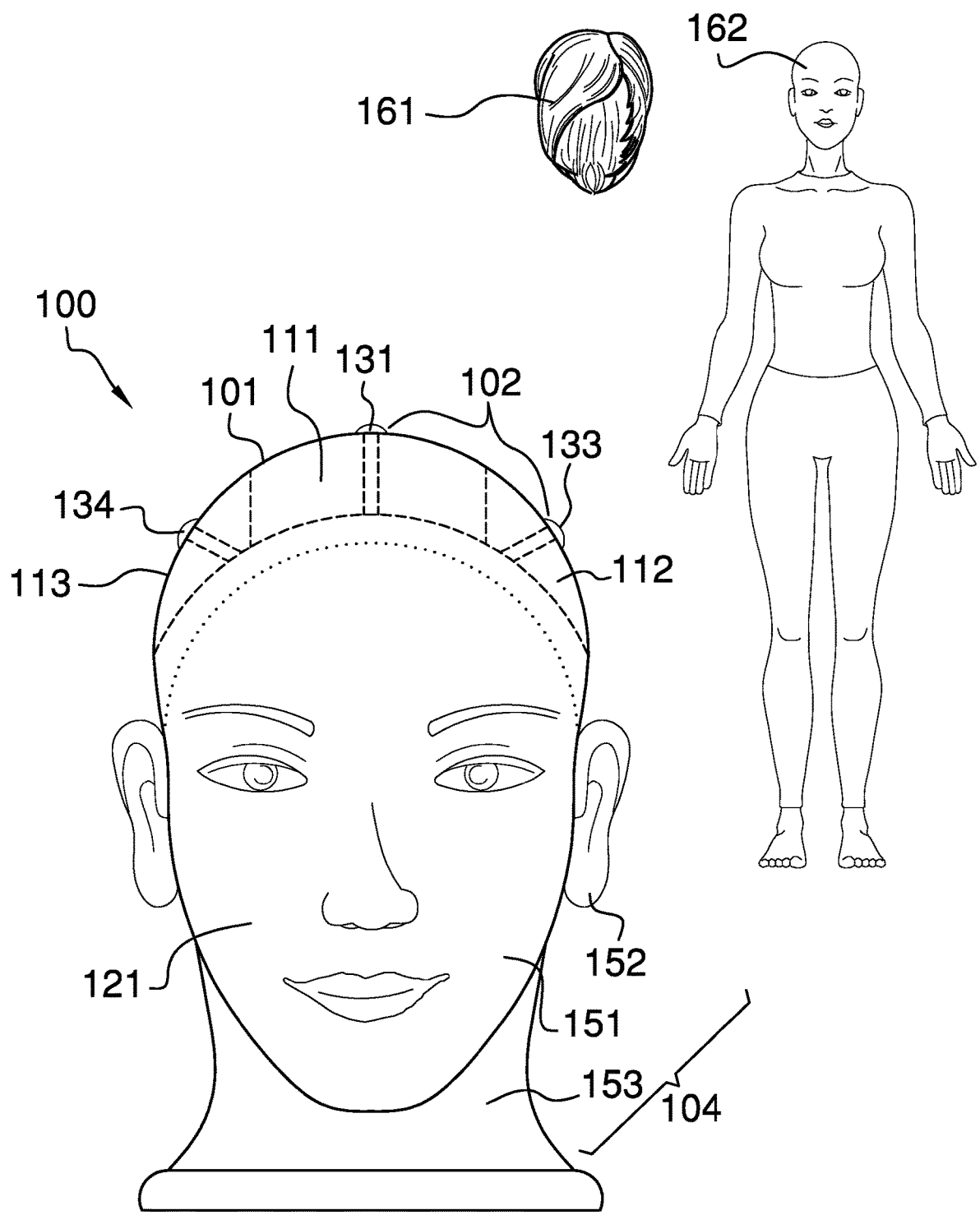
FIG. 1 is a front view of an embodiment of the disclosure.
Figure 2:
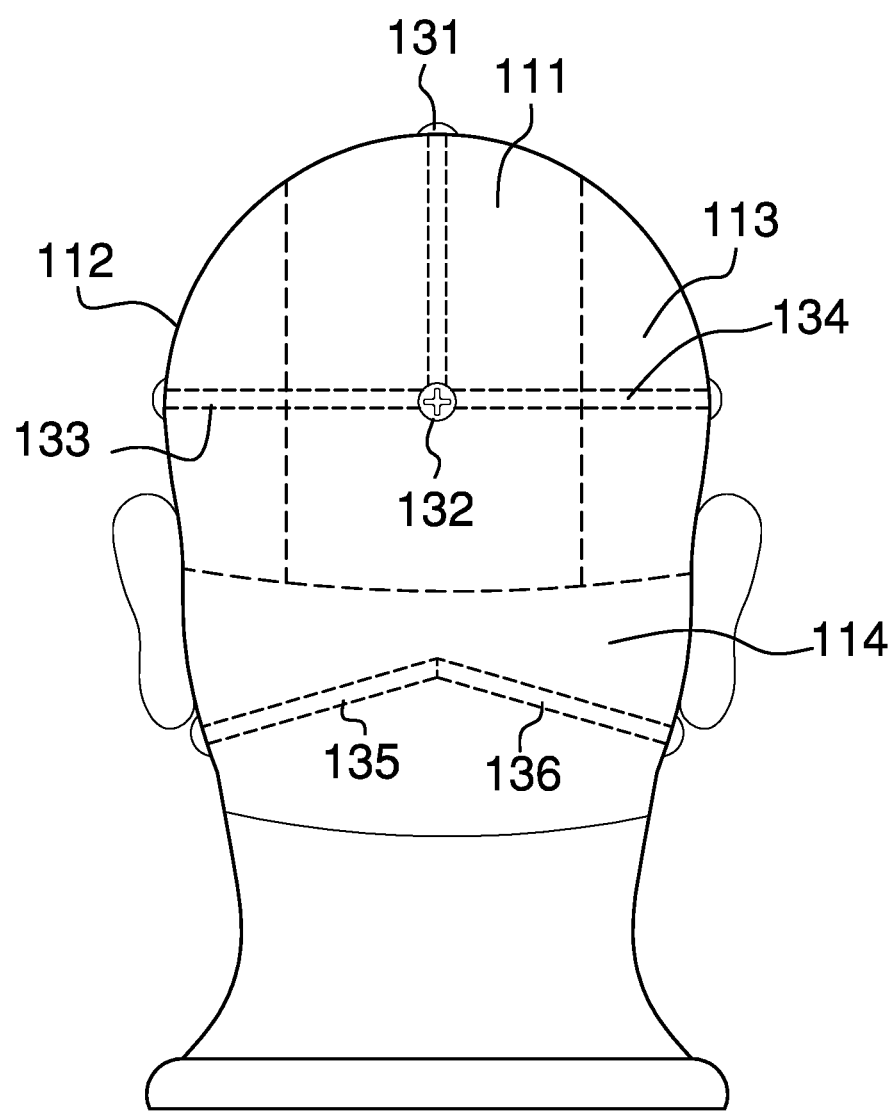
FIG. 2 is a rear view of an embodiment of the disclosure.
Figure 4:
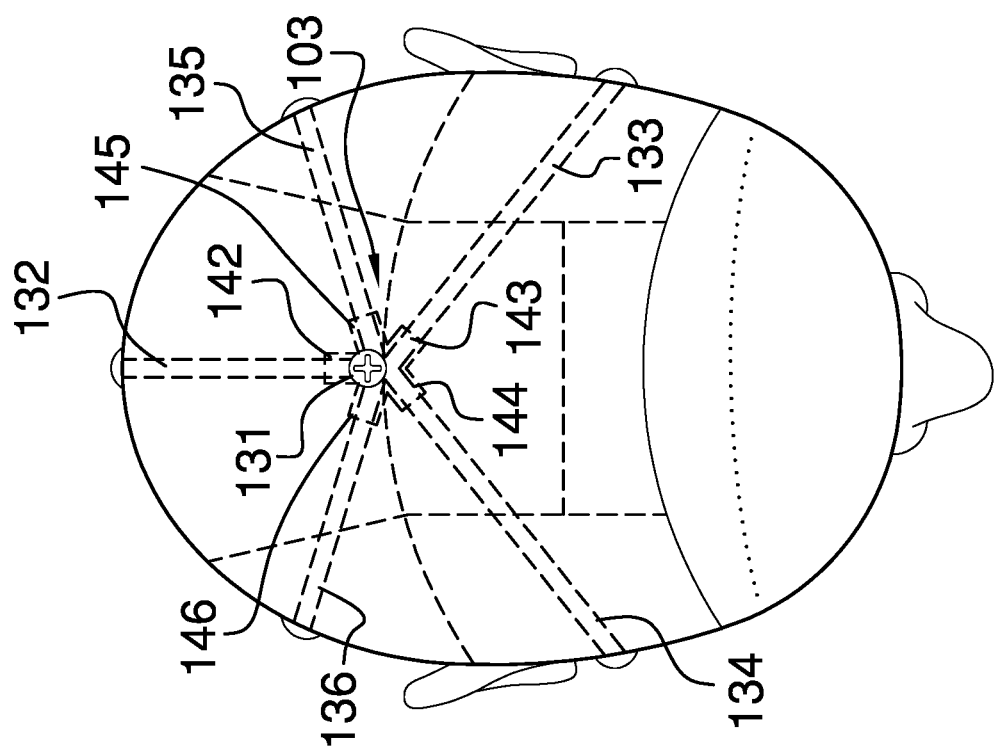
FIG. 4 is a top view of an embodiment of the disclosure.
Figure 3:
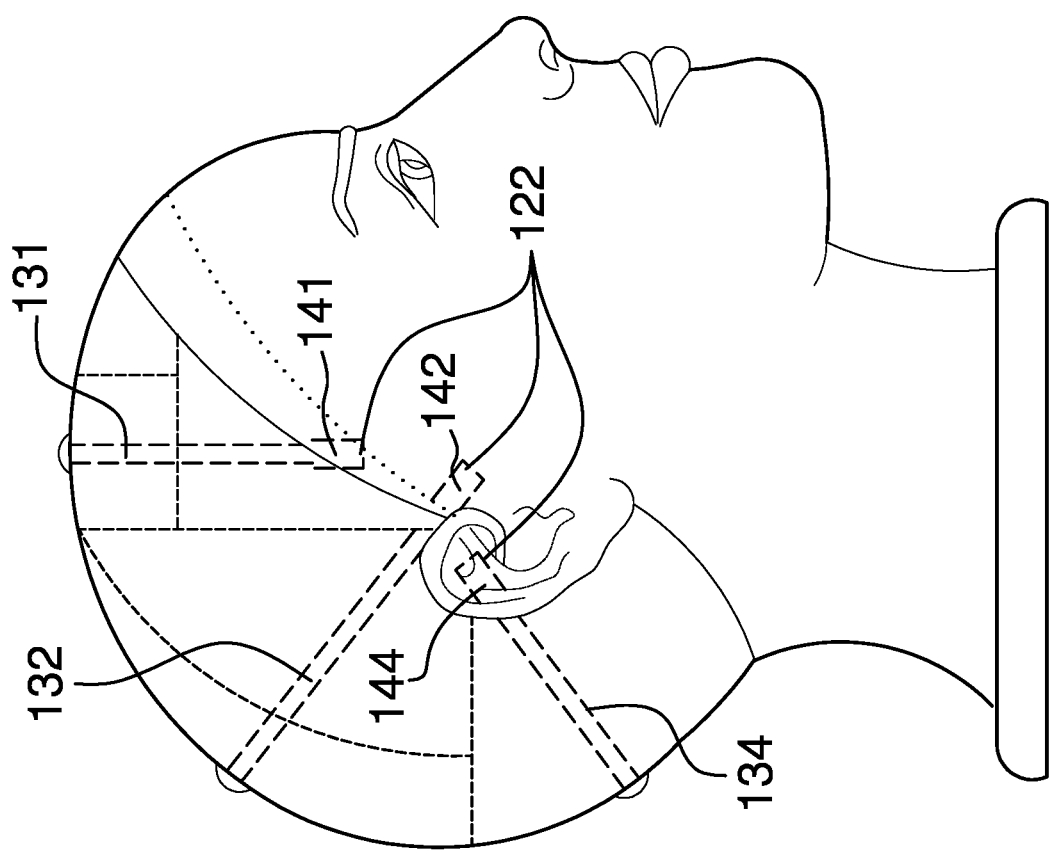
FIG. 3 is a side view of an embodiment of the disclosure.
Figure 5:
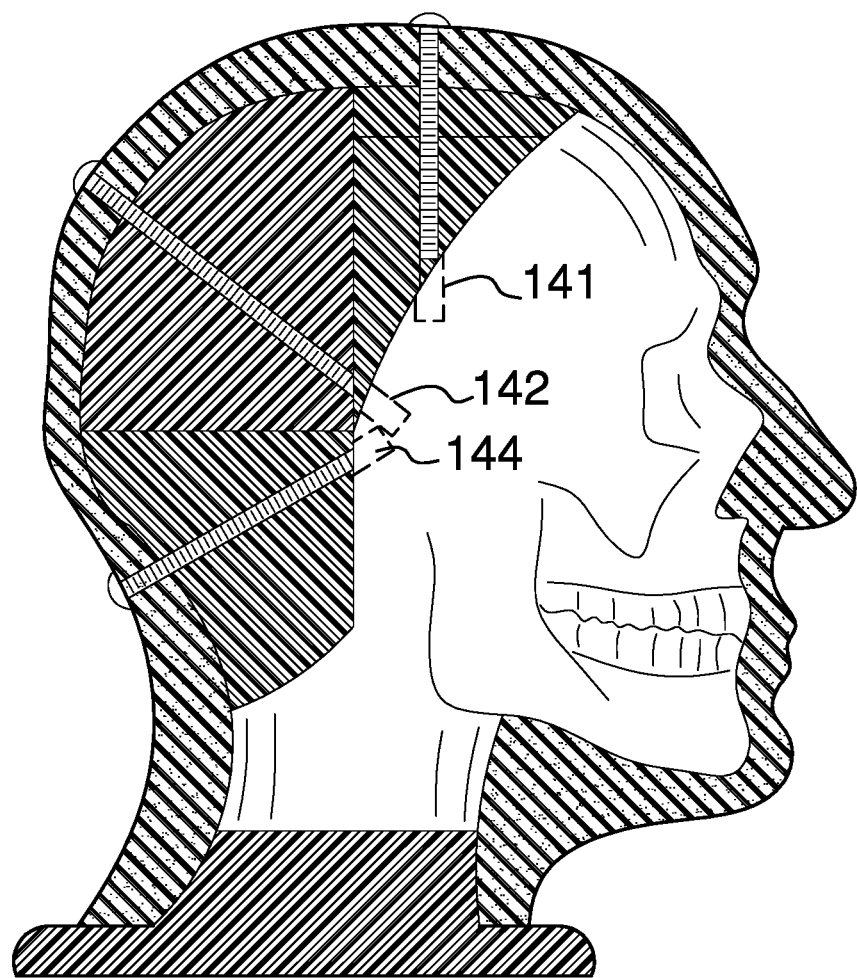
FIG. 5 is a cross-sectional view of an embodiment of the disclosure.

Detailed reference will now be made to one or more potential embodiments of the disclosure, which are illustrated in FIGS. 1 through 5.

The adjustable mannequin head 100 (hereinafter invention) is a wig stand that forms a puppet shaped like a human head. The invention 100 is configured for use in hairdressing. The invention 100 is configured for use in the preparation and fitting of a postiche 161. The postiche 161 refers to a hairpiece. The postiche 161 mounts on the invention 100 during the hairdressing activities. The invention 100 is a semi-rigid structure with an elastic nature. The invention 100 comprises a cranial structure 101 further comprising independently adjustable sections that correspond to the cranial bones of a human skull. The independently adjustable sections of the cranial structure 101 of invention 100 enable the invention 100 to adjust such that the exterior surfaces of the invention 100 can be adjusted to resemble the shape of the head of a client.

The invention 100 comprises the cranial structure 101, a plurality of bolts 102, an anchor structure 103, and an orientation structure 104. The cranial structure 101 supports the postiche 161 during the hairdressing activities. The plurality of bolts 102 adjusts the shape of the exterior surfaces of the cranial structure 101. The anchor structure 103 secures the plurality of bolts 102 into position. The orientation structure 104 provides a hairdresser 162 with cues that allow the hairdresser 162 to envision better how the postiche 161 will look. The hairdresser 162 refers to an individual using the invention 100.

The cranial structure 101 forms the superior and posterior elements of the puppet. The cranial structure 101 is the structure of the invention 100 that adjusts to match the head of a client. The postiche 161 rests on the cranial structure 101 during hairdressing activities. The exterior surfaces of the cranial structure 101 are formed from an elastomeric material. The applicant prefers that the cranial structure 101 is formed from silicone. The cranial structure 101 comprises a medial shell 111, a left parietal shell 112, a right parietal shell 113, and an occipital shell 114. The medial shell 111, the left parietal shell 112, the right parietal shell 113, and the occipital shell 114 join together to form a single solid structure.

The medial shell 111 is a semi-rigid structure with an elastic nature. The medial shell 111 is formed from a silicone based elastomeric material. The medial shell 111 is formed such that the external surfaces model a portion of a human skull. The medial shell 111 emulates the regions of the skull covering the medial regions of the frontal bone, the left parietal bone, and the right parietal bone.

The left parietal shell 112 is a semi-rigid structure with an elastic nature. The left parietal shell 112 is formed from a silicone based elastomeric material. The left parietal shell 112 is formed such that the external surfaces model a portion of a human skull. The left parietal shell 112 emulates the regions of the skull covering the left distal region of the frontal bone and the distal region of the left parietal bone.

The right parietal shell 113 is a semi-rigid structure with an elastic nature. The right parietal shell 113 is formed from a silicone based elastomeric material. The right parietal shell 113 is formed such that the external surfaces model a portion of a human skull. The right parietal shell 113 emulates the regions of the skull covering the right distal region of the frontal bone and the distal region of the right parietal bone.

The occipital shell 114 is a semi-rigid structure with an elastic nature. The occipital shell 114 is formed from a silicone based elastomeric material. The occipital shell 114 is formed such that the external surfaces model a portion of a human skull. The occipital shell 114 emulates the regions of the skull covering the left temporal bone, the right temporal bone, and the occipital bone.

Each of the plurality of bolts 102 is a commercially available bolt. Each of the plurality of bolts 102 screws into the cranial structure 101 such that as any selected bolt tightens, the selected bolt exerts a force of the exterior surface of the cranial structure 101. The forces exerted by the plurality of bolts 102 deform the elastomeric exterior surfaces of the cranial structure 101 such that the overall exterior surface of the cranial structure 101 is modified to match the head of a client. Each of the plurality of bolts 102 screws into the anchor structure 103. The plurality of bolts 102 comprises an anterior medial bolt 131, a posterior medial bolt 132, a left parietal bolt 133, a right parietal bolt 134, a left occipital bolt 135, and a right occipital bolt 136.

The anterior medial bolt 131 is a commercially available bolt that inserts through the anterior region of the medial shell 111 into the anchor structure 103. The posterior medial bolt 132 is a commercially available bolt that inserts through the posterior region of the medial shell 111 into the anchor structure 103. The left parietal bolt 133 is a commercially available bolt that inserts through the left parietal shell 112 into the anchor structure 103. The right parietal bolt 134 is a commercially available bolt that inserts through the right parietal shell 113 into the anchor structure 103. The left occipital bolt 135 is a commercially available bolt that inserts through the left side of the occipital shell 114 into the anchor structure 103. The right occipital bolt 136 is a commercially available bolt that inserts through the right side of the occipital shell 114 into the anchor structure 103.

The anchor structure 103 is a rigid structure. The anchor structure 103 forms the anterior surfaces of the puppet. Each of the plurality of bolts 102 screws into the anchor structure 103. The anchor structure 103 provides the counter force that allows each of the plurality of bolts 102 to deform the cranial structure 101. The anchor structure 103 comprises a rigid element 121 and a plurality of nuts 122.

The rigid element 121 is a rigid structure that forms a portion of the anterior regions of the puppet. The rigid element 121 is formed to resemble the anterior bone structure of a skull commonly called a face 151. In the first potential embodiment of the disclosure, the applicant prefers that the rigid element 121 is formed from silicone. The applicant prefers silicone because of its less reactive nature compared to other materials.

Each of the plurality of nuts 122 is a commercially available hardware item. Each of the plurality of nuts 122 mounts in the rigid element 121. Each of the plurality of nuts 122 has a one to one correspondence to a bolt selected from the plurality of bolts 102. As a bolt screws into its corresponding nut, the exterior surface of the cranial structure 101 deforms to match the head of the client. The plurality of nuts 122 comprises an anterior medial nut 141, a posterior medial nut 142, a left parietal nut 143, a right parietal nut 144, a left occipital nut 145, and a right occipital nut 146.

The anterior medial nut 141 mounts in the rigid element 121 of the anchor structure 103 such that the anterior medial bolt 131 screws into the anterior medial nut 141. The posterior medial nut 142 mounts in the rigid element 121 of the anchor structure 103 such that the posterior medial bolt 132 screws into the posterior medial nut 142.

The left parietal nut 143 mounts in the rigid element 121 of the anchor structure 103 such that the left parietal bolt 133 screws into the left parietal nut 143.

The right parietal nut 144 mounts in the rigid element 121 of the anchor structure 103 such that the right parietal bolt 134 screws into the right parietal nut 144.

The left occipital nut 145 mounts in the rigid element 121 of the anchor structure 103 such that the left occipital bolt 135 screws into the left occipital nut 145. The right occipital nut 146 mounts in the rigid element 121 of the anchor structure 103 such that the right occipital bolt 136 screws into the right occipital nut 146.

The orientation structure 104 comprises a plurality of recreations of well-known visible features associated with the human head. The orientation structure 104 provides the hairdresser 162 with visual cues that help the hairdresser 162 to visualize how the postiche 161 will look when worn by a client. The orientation structure 104 comprises a face 151, ears 152, and a neck 153. The face 151 comprises images of the eyes, nose, and mouth of a face 151. The images of the face 151 are portrayed on the anterior surfaces of the anchor structure 103. The ears 152 are structures that emulate the appearance of the human ears 152. The neck 153 is a structure that emulates the neck 153 of a human body. The neck 153 forms the pedestal of the invention 100.

The following definitions and directional references were used in this disclosure:

Anterior: As used in this disclosure, anterior is a term that is used to refer to the front side or direction of a structure. When comparing two objects, the anterior object is the object that is closer to the front of the structure.

Bolt: As used in this disclosure, a bolt is a cylindrical shaft that is formed with an exterior screw thread. A bolt is defined with an outer diameter.

Coronal Plane: As used in this disclosure, the coronal plane refers to a reference plane that bisects an anterior surface and posterior surface.

Correspond: As used in this disclosure, the term correspond means that a first object is in some manner linked to a second object in a relationship.

Distal: As used in this disclosure, distal refers to a directional sense or location of the body. Specifically, distal refers to a first object or a side of a first object that is distal from the medial axis or more proximal to from the side of the body relative to a second object or side of a second object.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Exterior Screw Thread: An exterior screw thread is a ridge wrapped around the outer surface of a tube in the form of a helical structure that is used to convert rotational movement into linear movement.

Hardware: As used in this disclosure, refers to one or more incidental objects: 1) that are readily and commercially available; and, 2) that are associated with the installation, operation or maintenance of a primary object. Always use incidental.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, inferior refers to a directional sense or location of the body. Specifically, inferior refers to an object or a side of an object that is proximal to the feet or distal from the head of the body.

Interior Screw Thread: An interior screw thread is a groove that is formed around the inner surface of a tube in the form of a helical structure that is used to convert rotational movement into linear movement.

Medial: As used in this disclosure, medial refers to a directional sense or location of the body. Specifically, medial refers to a first object or a side of a first object that is closer to the medial axis or more distal from the side of the body relative to a second object or side of a second object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Orientation: As used in this disclosure, orientation refers to the positioning of a first object relative to: 1) a second object; or, 2) a fixed position, location, or direction.

Pedestal: As used in this disclosure, a pedestal is an intermediary load bearing structure that that transfers a load path between a supporting surface and an object, structure, or load.

Posterior: As used in this disclosure, posterior is a term that is used to refer to the side of a human body that is distal from the anterior side. When comparing two objects, the posterior object is the object that is distal from the anterior side of the human body.

Postiche: As used in this disclosure, postiche refers to an artificial structure that emulates hair. The postiche is used for cosmetic or other purposes. Examples of a postiche include, but are not limited to, wigs and toupees.

Puppet: As used in this disclosure, a puppet is a three-dimensional figure resembling a human, animal or symbolic image that can be moved and that is used for entertainment or educational purposes.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Sagittal Plane: As used in this disclosure, the sagittal plane refers to a plane that is perpendicular to the both the coronal (or lateral) plane and the transverse plane.

Screw: As used in this disclosure, to screw is a verb meaning: 1) to fasten or unfasten (unscrew) a threaded connection; or 2) to attach a helical structure to a solid structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Silicone: As used in this disclosure, silicone is a substance formed from silicon (Si) and oxygen (O) that forms the backbone of polymer type chains similar to polymers that are formed by carbon. Though exceptions do exist, silicone is generally considered to be less reactive and to have better heat resistance when compared to most common carbon-based polymers.

Skull: As used in this disclosure, the skull refers to a bone structure that encloses the brain of a human body. The skull comprises six primary cranial bones and a plurality of other bones. The six primary cranial bones comprise: the frontal bone, the left parietal bone, the right parietal bone, the left temporal bone, the right temporal bone, and the occipital bone. The frontal bone forms the superior anterior enclosure of approximately anterior portions of the brain. The left parietal bone encloses the left posterior region from the superior side. The right parietal bone encloses the right posterior region from the superior side. The left temporal bone encloses the left posterior region from the inferior side. The right temporal bone encloses the right posterior region from the inferior side. The occipital bone encloses the posterior region of the brain from the inferior side.

Superior: As used in this disclosure, superior refers to a directional sense or location of the body. Specifically, superior refers to an object or a side of an object that is distal from the feet or proximal to the head of the body.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Transverse Plane: As used in this disclosure, a transverse plane is a plane that divides an object into a superior section and an inferior section. In a person, the transverse plane would be perpendicular to the medial axis of a body.

The directional references used in this disclosure correspond to the directional references from the perspective of the hypothetical person the disclosure is modeling. As such, left refers to the direction towards the left side of the modeled person and right refers to the direction towards the right side of the modeled person. Superior refers to the direction towards the head of the modeled person and inferior refers to the direction towards the feet of the modeled person. Anterior refers to front side of the modeled person and posterior refers to the back side of the modeled person.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A customizable wig stand comprising:
   a cranial structure, a plurality of bolts, an anchor structure, and an orientation structure;
   wherein the plurality of bolts attach the cranial structure to the anchor structure;
   wherein the orientation structure mounts on the cranial structure and the anchor structure;
   wherein the customizable wig stand forms a puppet shaped like a human head;
   wherein the customizable wig stand is configured for use by a hairdresser;
   wherein the customizable wig stand is configured for use with a postiche;
   wherein the customizable wig stand is a semi-rigid structure with an elastic nature.

2. The customizable wig stand according to claim 1
   wherein the customizable wig stand comprises independently adjustable sections that correspond to the cranial bones of a human skull;
   wherein customizable wig stand adjusts such that the exterior surfaces of the customizable wig stand can be adjusted to resemble the shape of any specific head.

3. The customizable wig stand according to claim 2
   wherein the plurality of bolts adjusts the shape of the exterior surfaces of the cranial structure.

4. The customizable wig stand according to claim 3
   wherein the anchor structure secures the plurality of bolts into position;
   wherein the orientation structure provides a hairdresser with visual cues.

5. The customizable wig stand according to claim 4
   wherein the cranial structure forms superior and posterior elements of the puppet;
   wherein the cranial structure adjusts to match the specific head;
   wherein the postiche rests on the cranial structure during hairdressing activities;
   wherein the exterior surfaces of the cranial structure are formed from an elastomeric material.

6. The customizable wig stand according to claim 5
   wherein each of the plurality of bolts screws into the cranial structure such that as any selected bolt tightens, the selected bolt exerts a force on the exterior surface of the cranial structure;
   wherein the forces exerted by the plurality of bolts deform the elastomeric exterior surfaces of the cranial structure such that the overall exterior surface of the cranial structure is modified to match the specific head.

7. The customizable wig stand according to claim 6
   wherein the anchor structure is a rigid structure;
   wherein the anchor structure forms anterior surfaces of the puppet.

8. The customizable wig stand according to claim 7
   wherein the cranial structure comprises a medial shell, a left parietal shell, a right parietal shell, and an occipital shell;
   wherein the medial shell, the left parietal shell, the right parietal shell, and the occipital shell join together to form a single solid structure.

9. The customizable wig stand according to claim 8
   wherein the medial shell is formed such that the external surfaces model a portion of a human skull;
   wherein the human skull is further defined with a frontal bone, a left parietal bone, a right parietal bone, a left temporal bone, a right temporal bone, and an occipital bone;
   wherein the medial shell emulates the regions of the skull covering the medial regions of the frontal bone, the left parietal bone, and the right parietal bone;
   wherein the left parietal shell emulates the regions of the skull covering the left distal region of the frontal bone and the distal region of the left parietal bone;
   wherein the right parietal shell emulates the regions of the skull covering the right distal region of the frontal bone and the distal region of the right parietal bone;
   wherein the occipital shell emulates the regions of the skull covering the left temporal bone, the right temporal bone, and the occipital bone.

10. The customizable wig stand according to claim 9
    wherein the medial shell is a semi-rigid structure with an elastic nature;
    wherein the left parietal shell is a semi-rigid structure with an elastic nature;
    wherein the right parietal shell is a semi-rigid structure with an elastic nature;
    wherein the occipital shell is a semi-rigid structure with an elastic nature.

11. The customizable wig stand according to claim 10
wherein the plurality of bolts comprises an anterior medial bolt, a posterior medial bolt, a left parietal bolt, a right parietal bolt, a left occipital bolt, and a right occipital bolt;
wherein the anterior medial bolt inserts through the anterior region of the medial shell into the anchor structure;
wherein the posterior medial bolt inserts through the posterior region of the medial shell into the anchor structure;
wherein the left parietal bolt inserts through the left parietal shell into the anchor structure;
wherein the right parietal bolt inserts through the right parietal shell into the anchor structure;
wherein the left occipital bolt inserts through the left side of the occipital shell into the anchor structure;
wherein the right occipital bolt inserts through the right side of the occipital shell into the anchor structure.

12. The customizable wig stand according to claim 11
wherein the anchor structure comprises a rigid element and a plurality of nuts;
wherein the plurality of nuts install in the rigid element.

13. The customizable wig stand according to claim 12
wherein the rigid element forms a portion of the anterior regions of the puppet;
wherein the rigid element is formed to resemble the anterior bone structure of the human skull.

14. The customizable wig stand according to claim 13 wherein each of the plurality of nuts has a one to one correspondence to a bolt selected from the plurality of bolts.

15. The customizable wig stand according to claim 14 wherein as the selected bolt screws into its corresponding nut the exterior surface of the cranial structure deforms to match the specific head.

16. The customizable wig stand according to claim 15
wherein the plurality of nuts comprises an anterior medial nut, a posterior medial nut, a left parietal nut, a right parietal nut, a left occipital nut, and a right occipital nut;
wherein the anterior medial nut mounts in the rigid element of the anchor structure such that the anterior medial bolt screws into the anterior medial nut;
wherein the posterior medial nut mounts in the rigid element of the anchor structure such that the posterior medial bolt screws into the posterior medial nut;
wherein the left parietal nut mounts in the rigid element of the anchor structure such that the left parietal bolt screws into the left parietal nut;
wherein the right parietal nut mounts in the rigid element of the anchor structure such that the right parietal bolt screws into the right parietal nut;
wherein the left occipital nut mounts in the rigid element of the anchor structure such that the left occipital bolt screws into the left occipital nut;
wherein the right occipital nut mounts in the rigid element of the anchor structure such that the right occipital bolt screws into the right occipital nut.

17. The customizable wig stand according to claim 16
wherein the orientation structure comprises a face, ears, and a neck;
wherein the face mounts on the exterior surfaces of the anchor structure;
wherein the ears mount on the cranial structure;
wherein the neck forms a pedestal that supports the customizable wig stand.

18. The customizable wig stand according to claim 17
wherein the face comprises images of the eyes, nose, and mouth of a face;
wherein the ears are structures that emulate the appearance of the human ears;
wherein the neck is a structure that emulates the neck of a human body.

19. The customizable wig stand according to claim 18
wherein the cranial structure is formed from silicone;
wherein the rigid element is formed from silicone.

\* \* \* \* \*